(12) United States Patent
Jesse, Jr.

(10) Patent No.: US 12,479,189 B2
(45) Date of Patent: Nov. 25, 2025

(54) HYDRATION BLADDER DRYING APPARATUS AND METHOD OF MANUFACTURE

(71) Applicant: Fossil Outdoor Inc., Scottsdale, AZ (US)

(72) Inventor: Everett Albert Jesse, Jr., Scottsdale, AZ (US)

(73) Assignee: Fossil Outdoor Inc., Scottsdale, AZ (US)

( * ) Notice: Subject to any disclaimer, the term of this patent is extended or adjusted under 35 U.S.C. 154(b) by 0 days.

(21) Appl. No.: 18/506,286

(22) Filed: Nov. 10, 2023

(65) Prior Publication Data

US 2024/0140067 A1    May 2, 2024

Related U.S. Application Data

(63) Continuation of application No. 16/925,608, filed on Jul. 10, 2020, now Pat. No. 11,845,255.

(Continued)

(51) Int. Cl.
*B32B 5/32* (2006.01)
*A45F 3/16* (2006.01)
(Continued)

(52) U.S. Cl.
CPC ............... *B32B 5/32* (2013.01); *A45F 3/20* (2013.01); *B32B 5/022* (2013.01); *B32B 5/024* (2013.01);
(Continued)

(58) Field of Classification Search
CPC ........... B32B 5/32; B32B 5/022; B32B 5/024; B32B 7/09; B32B 2262/0276;
(Continued)

(56) References Cited

U.S. PATENT DOCUMENTS 1,595,899 A    8/1926  Mcdonough
3,523,536 A    8/1970  Ruffo
(Continued)

FOREIGN PATENT DOCUMENTS

EP    0192265 A2    8/1986
GB    2379157 A  *  3/2003  ........... A41D 13/002

OTHER PUBLICATIONS

"Drying out your Camelbak's bladder-SIngletracks Mountain Bike News", post 74840, dated Sep. 6, 2008. (Year: 2008).*

*Primary Examiner* — Elizabeth M Imani
(74) *Attorney, Agent, or Firm* — Jacob M. Ward; Ward Law Office LLC

(57) ABSTRACT

A moisture removal apparatus configured for partial insertion into a primary opening of a moisture containing container is provided. The moisture removal apparatus includes a first end portion positioned within a moisture containing portion of the moisture containing container. The first end portion has a first material layer configured to absorb moisture from the moisture containing container. The first material layer is further configured to transport the absorbed moisture to a second material layer. A second end portion is spaced apart from the first end portion and extends beyond the moisture containing container. The second end portion is configured to receive absorbed moisture from the second material layer and is further configured for direct air contact for purposes of evaporation of the absorbed moisture.

20 Claims, 3 Drawing Sheets

Related U.S. Application Data

(60) Provisional application No. 62/873,000, filed on Jul. 11, 2019.

(51) Int. Cl.
*A45F 3/20* (2006.01)
*B32B 5/02* (2006.01)
*B32B 7/09* (2019.01)
*B65D 81/26* (2006.01)

(52) U.S. Cl.
CPC .............. *B32B 7/09* (2019.01); *B65D 81/264* (2013.01); *A45F 3/166* (2025.01); *B32B 2262/0276* (2013.01); *B32B 2262/062* (2013.01); *B32B 2307/728* (2013.01); *B32B 2439/46* (2013.01)

(58) Field of Classification Search
CPC ........ B32B 2262/062; B32B 2307/728; B32B 2439/46; B32B 5/028; B32B 2250/20; B32B 2262/0253; B32B 2262/0269; B32B 5/26; B32B 2250/02; B32B 2262/0207; B32B 2262/0246; B32B 2262/0261; B32B 2262/04; B32B 2262/10; B32B 2272/00; B32B 7/05; B32B 19/06; B32B 2262/08; A45F 3/20; A45F 2003/166

See application file for complete search history.

(56) References Cited

U.S. PATENT DOCUMENTS

| | | | |
|---|---|---|---|
| 3,592,194 A | | 7/1971 | Duncan |
| 4,681,578 A | | 7/1987 | Anderson et al. |
| 5,066,527 A | | 11/1991 | Newell |
| 5,131,387 A | * | 7/1992 | French ................... A61B 5/097 |
| | | | 128/205.12 |
| 5,135,787 A | | 8/1992 | Bair |
| 6,108,823 A | | 8/2000 | Danes |
| 2003/0113507 A1 | | 6/2003 | Niemeyer et al. |
| 2007/0184734 A1 | | 8/2007 | Ramsay |
| 2009/0133446 A1 | | 5/2009 | Burrow et al. |
| 2011/0119810 A1 | | 5/2011 | Diaz |
| 2012/0042430 A1 | | 2/2012 | McConaghy et al. |
| 2012/0184933 A1 | | 7/2012 | Floeter et al. |
| 2013/0105097 A1 | | 5/2013 | Joutsimo |
| 2013/0158494 A1 | * | 6/2013 | Ong ........................ A61F 13/53 |
| | | | 604/367 |
| 2014/0017804 A1 | | 1/2014 | Triva |
| 2014/0186224 A1 | | 7/2014 | Derby Krans |
| 2020/0315273 A1 | * | 10/2020 | Thompson ........... A41D 31/125 |

\* cited by examiner

HYDRATION BLADDER DRYING APPARATUS AND METHOD OF MANUFACTURE

RELATED APPLICATIONS

This application is a continuation of and claims the benefit of pending U.S. Utility patent application Ser. No. 16/925,608, filed Jul. 10, 2020 and U.S. Provisional Application No. 62/873,000, filed on 11 Jul. 2019, the contents of which are all incorporated herein by reference.

BACKGROUND

The ability to store liquids (such as water) may be beneficial. For instance, hydration bladders are a convenient way to carry water or other liquids, to be consumed at a later time (e.g., during a hike or bike ride). Typically, these bladders are carried in backpacks that are designed around the hydration bladder's use. These products may be used by athletes, casual adventurers, and even emergency response and military personnel, among others. The sizes of these bladders vary from several liters to only a few ounces.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

The above objects as well as other objects not specifically enumerated are achieved by a moisture removal apparatus configured for partial insertion into a primary opening of a moisture containing container. The moisture removal apparatus includes a first end portion positioned within a moisture containing portion of the moisture containing container. The first end portion has a first material layer configured to absorb moisture from the moisture containing container. The first material layer is further configured to transport the absorbed moisture to a second material layer. A second end portion is spaced apart from the first end portion and extends beyond the moisture containing container. The second end portion is configured to receive absorbed moisture from the second material layer and is further configured for direct air contact for purposes of evaporation of the absorbed moisture.

The above objects as well as other objects not specifically enumerated are achieved by a method of removing moisture from a moisture containing container. The method includes the steps of positioning a first end portion of a moisture removal apparatus within the moisture containing container, the first end portion having a first material layer and a second material layer, absorbing moisture from the moisture containing container through the first material layer, transporting the absorbed moisture from the first material layer to a second material layer, transporting the absorbed moisture from the second material layer to a second end portion of the moisture removal apparatus, the second end portion spaced apart from the first end portion, extending the second end portion beyond the moisture containing container and exposing the second end portion to direct air contact for purposes of evaporation of the absorbed moisture.

The above objects as well as other objects not specifically enumerated are achieved by an apparatus combination for removing moisture. The apparatus combination includes a container having a primary opening and a moisture containing portion. A moisture removal apparatus is configured for partial insertion into the primary opening of the moisture containing container. The moisture removal apparatus includes a first end portion positioned within the moisture containing portion of the moisture containing container. The first end portion has a first material layer configured to absorb moisture from the moisture containing container. The first material layer is further configured to transport the absorbed moisture to a second material layer. A second end portion is spaced apart from the first end portion and extends beyond the moisture containing container. The second end portion is configured to receive absorbed moisture from the second material layer and is further configured for direct air contact for evaporation of the absorbed moisture.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

The drawings described herein are for illustrative purposes only of selected embodiments and not all possible implementations, and are not intended to limit the scope of the present disclosure.

Like reference symbols in the various drawings may indicate like elements.

DETAILED DESCRIPTION

Figure 1:
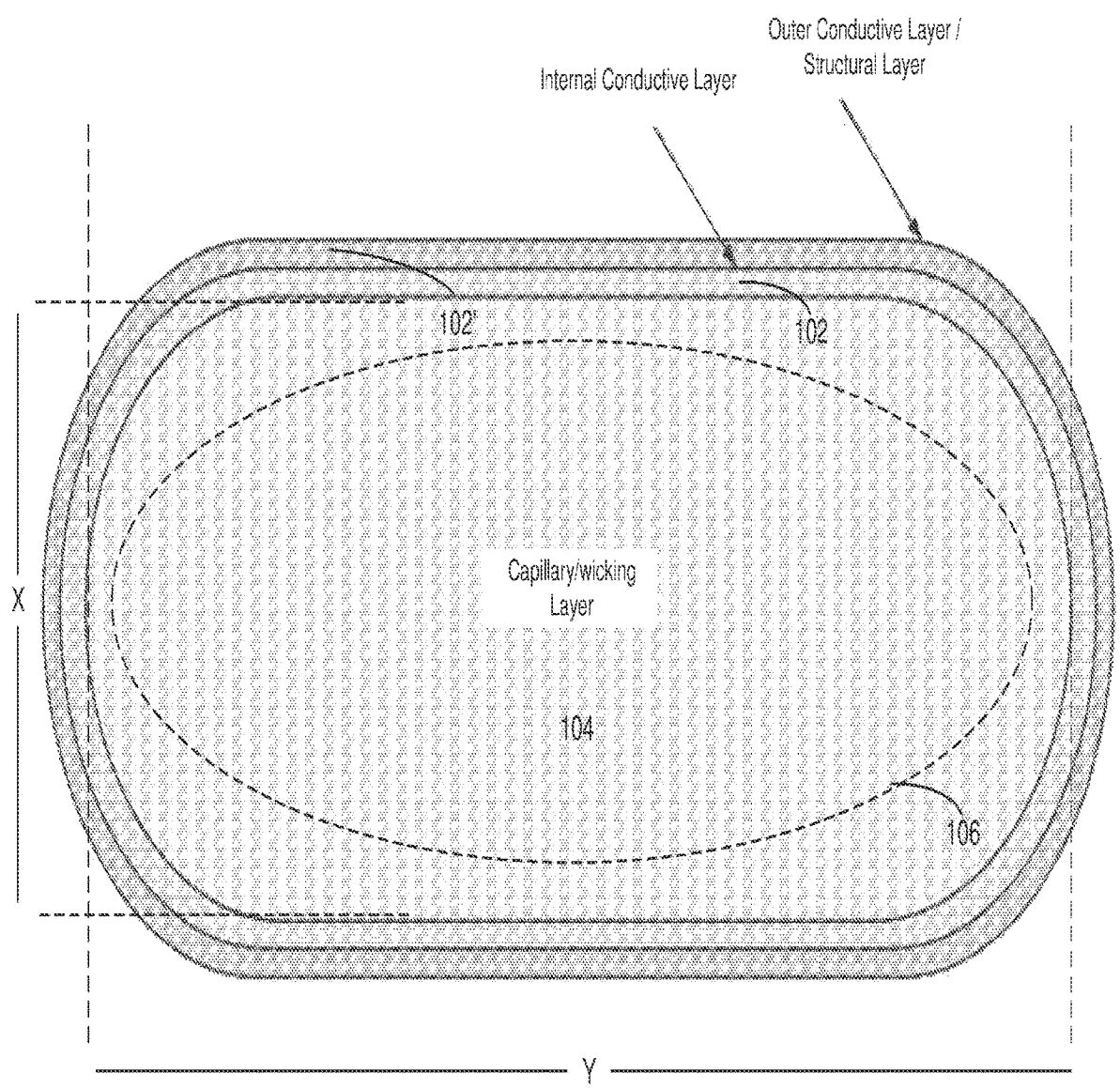
FIG. 1 is an example diagrammatic view of a moisture removing apparatus according to one or more example implementations of the disclosure.

In some implementations, the flowchart and block diagrams in the figures illustrate the architecture, functionality, and operation of possible implementations of apparatus and methods for making same according to various implementations of the present disclosure. It should be noted that, in some implementations, the steps noted in the block(s) may occur out of the order noted in the figures (or combined, or omitted shown as dashes). For example, two blocks shown in succession may, in fact, be executed substantially concurrently, or the blocks may sometimes be executed in the reverse order, depending upon the functionality involved.

As noted above, the ability to store liquids (such as water) may be beneficial. For instance, hydration bladders are a convenient way to carry water or other liquids, to be consumed at a later time (e.g., during a hike or bike ride). An example of such a hydration bladder may be the kind found in the hydration backpack offered by Camelbak® of Petaluma, CA. Typically, these bladders are carried in backpacks that are designed around the hydration bladder's use. These products may be used by athletes, casual adventurers, and even emergency response and military personnel, among others. The sizes of these bladders vary from several liters to only a few ounces.

Although these products may be convenient and widely used, hydration bladders themselves may be susceptible to mildew and other microbes that may be difficult to remove/clean and may ruin the bladder. For this reason, it may be beneficial to ensure that the bladder is completely dried after use. This is not always easy to do, at least because of the flexibility (e.g., creating pockets of leftover moisture), the shape of the bladder (e.g., small openings making it difficult to reach all areas of the bladder), and the fact that even the smallest amount of leftover moisture may lead to milden/microbes and destroy the hydration bladder over time (e.g., by degrading the material of the bladder or leaving an unpleasant smell and taste to the liquid). As a result, owners of these bladders may attempt to remove as much moisture as possible after use, or simply buy another bladder when needed.

Some bladder users may try to use a hanger-like product. These types of products attempt to prop the bladder open so it can air-dry (which may take hours or days) and attempt to use gravity to remove as much moisture as possible, but some moisture may inevitably remain. As noted above, even the smallest amount of leftover moisture may lead to mildew/microbes and destroy the hydration bladder over time (e.g., by degrading the material of the bladder or leaving an unpleasant smell and taste to the liquid). Moreover, these hanger-like products may force users to use valuable storage space, and may not entirely dry the bladder where the product comes in contact with the bladder material. As such, as will be described below, the present disclosure may address these example and non-limiting hygiene problems by using a unique absorbing material to absorb the remaining moisture in the bladder, and then wicking it outside of the hydration bladder where it may be naturally evaporated, thereby reducing the possibility of microbes forming within the bladder. Example and non-limiting advantages of the present disclosure may include convenience (e.g., taking little time to install), tidiness (e.g., allows the drying hydration bladder to be stored anywhere, even the backpack in which the bladder comes, cleanliness (e.g., fibers may be anti-microbial and biodegradable), durability (e.g., machine washable and may not require replacement for, e.g., at least 6 months), efficiency (e.g., moisture may be absorbed up to at least, e.g., 6 times faster than typical paper towels), and flexibility (e.g., may be folded and flexed to fit all styles of hydration bladders.

Figure 2:
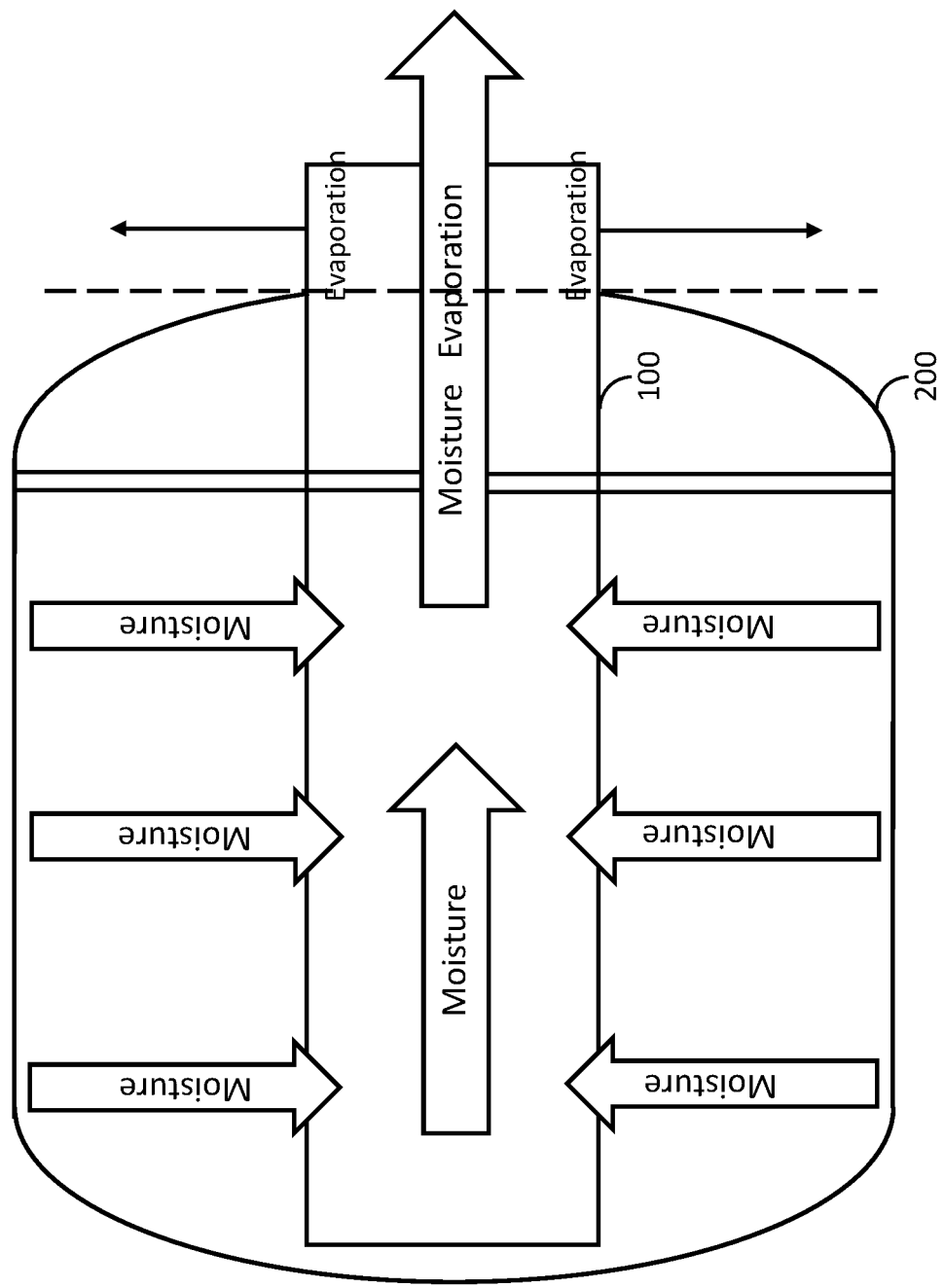
FIG. 2 is an example diagrammatic view of a moisture removing apparatus inside a container according to one or more example implementations of the disclosure.
Figure 3:
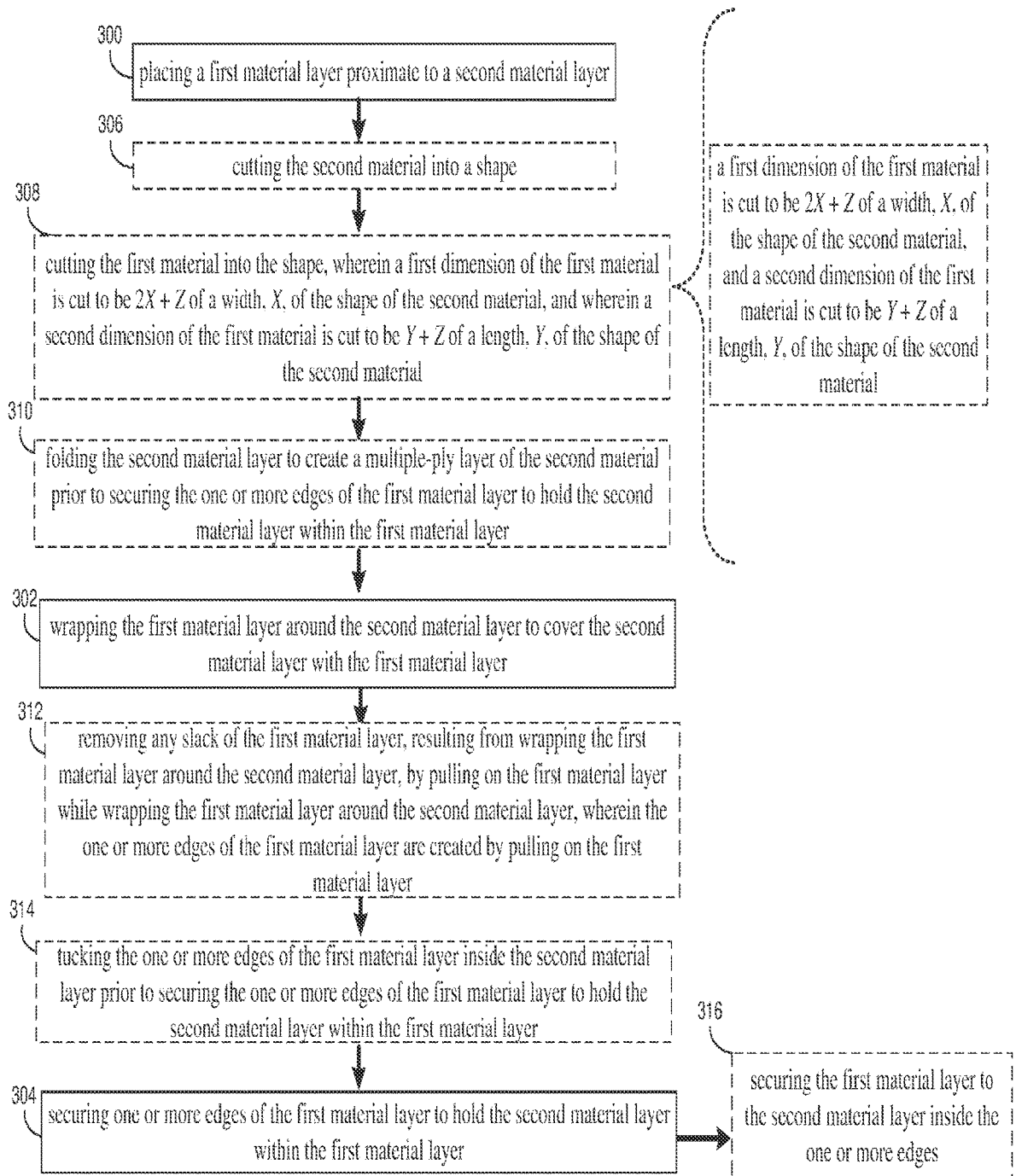
FIG. 3 is an example flowchart of process to make an apparatus according to one or more example implementations of the disclosure.

As discussed above and referring also at least to the example implementations of FIGS. 1-3, a moisture removal (MR) apparatus, such as MR apparatus 100, is shown. In some implementations, a first material layer may be placed 300 proximate to a second material layer. In some implementations, the first material layer may be wrapped 302 around the second material layer to cover the second material layer with the first material layer. In some implementations, one or more edges of the first material layer may be secured 304 to hold the second material layer within the first material layer.

For instance, in some implementations, a first material layer (e.g., layer 102) may be placed 300 proximate to a second material layer (e.g., layer 104). For instance, layer 102 may be laid on top of layer 104. In some implementations, layer 102 may include at least one conductive layer. For instance, layer 102 may include only an internal conductive layer, but in some implementations, layer 102 may also include additional (external) conductive layers (e.g., layer 102'). As used herein, layer 102 may be used to refer to only a single internal conductive layer or a combination of additional conductive layers. It will be appreciated that more than two conductive layers may be used without departing from the scope of the present disclosure. Generally, the conductive layer may be referring to the layer that moves the moisture from one side of the material to the other (as shown in FIG. 2). This may be accomplished via the capillary action of the fibers within the layer(s). The structural layer's 102' purpose is to not restrict but to enhance the water absorption of layer 102 while providing MR apparatus 100 with structural support for both functional and/or aesthetic purposes. In some implementations, layer 102 may be, e.g., approximately 50% Bamboo and 50% Polyester (e.g., Repreve® Polyester, which may generally be described as woven hexagonal polyester mesh made from recycled plastic bottles). However, it will be appreciated that layer 102 may be made from different percentages of different materials without departing from the scope of the present disclosure. For example, layer 102 may function better as 100% polyester. The bamboo may be included, however, to make the total structure of MR apparatus 100 more easily decomposed. Thus, adding bamboo may be considered as an ethical choice to help the environment. 100% Bamboo may also be used, however, it may lack the stretchy composition that makes MR apparatus 100 appear as a tight skin around layer 104. With the cellulose/cotton (noted below), this may be variable as well.

In some implementations, layer 104 may include a wicking layer. The wicking layer is generally referring to the ability layer 104 has to pass freely any moisture back and forth to layer 102/102'. It will absorb moisture, but it will let it go as the more absorptive layer 102 grabs it. Conversely, layer 104 may allow air to come through so evaporation can take place and layer 102 is able to dry. In some implementations, layer 104 may be the same as layer 102'. In some implementations, layer 104 may be, e.g., approximately 70% cellulose and approximately 30% cotton cloth (and approximately 0.25" thick). However, it will be appreciated that layer 104 (as well as layer 102) may comprise any combination of materials. For instance, layer 102 and/or layer 104 may include at least one of a woven fiber, a non-woven fiber, a cellulosic fiber, an animal fiber, a mineral fiber, a nano-fiber, a chemistry fiber, cellulose, cotton, polyester, and bamboo. It will be appreciated that layer 104 may be made from different percentages of different materials and various thicknesses without departing from the scope of the present disclosure. For some of the materials of layer 104 (e.g., the polyester/bamboo), the weight may be 3.45-5.45 oz per sq. yd./151 GSM (+/-10%). For layers that may include, e.g., cotton and cellulose, the weight range may be based on the length of MR apparatus 100. For example ratios:

| h/t and wit | 720 to .0001 |
| t/h and t/w | 3600 to .0001 |
| h/w and w/h | 720 to .0001 |

When laid flat (2 dimensional or 3 dimensional)
Height Largest Dimension
Width less than or equal to the height
Thickness less than or equal to the width
This is because nonwoven fibers may theoretically be pressed into any thickness or configuration.

In some implementations, layer 104 may be cut 306 into a shape. For instance, layer 104 may be cut into a rectangle, circle, oval, dog bone, etc. It will be appreciated that any other shapes and designs may be used as a template to cut layer 104 (and/or layer 102). As such, the use of any particular shape should be taken as example only and not to otherwise limit the scope of the present disclosure.

In some implementations, and referring again at least to the example implementation of FIG. 1, layer 102 may be cut 308 into the shape, wherein the first dimension of layer 102 layer may be 2X+Z of a width, X, of the shape of layer 104, and wherein a second dimension of layer 102 may be Y+Z of a length, Y, of the shape of layer 104. For example, layer 102 may be cut into a rectangle where it is, e.g., 0.5" larger than twice intended unit size on the rectangle width and, e.g., 0.5" longer than the rectangle length. For instance, if MR apparatus 100 (or layer 104) is 17.5"×3.5" then layer 102 would be 18"×7.5. It will be appreciated that X, Y, and Z may vary according to the intended use of MR apparatus 100. For instance, there may be more extreme tolerances though which the above ratios describe. Essentially, if the width and/or thickness needs to be adjusted for increases or decreases in height. As an example, if the boundary is extended to 0.25" from 17.5" it may be desirable to make it either wider, thicker or both.

In some implementations, layer 104 may be folded 310 to create a multiple-ply layer of the second material layer prior to securing the one or more edges of the first material layer to hold the second material layer within the first material layer. For instance, layer 104 may be folded into a smaller rectangle creating a multiple-ply of the cloth. This step may done once or multiple times. In some implementations, multiple layers of layer 104 may be used instead of folding and/or multiple layers of layer 104 may each be folded.

In some implementations, layer 102 may be wrapped 302 around layer 104 to cover layer 104 with layer 102. For instance, layer 102 may be wrapped from the center in the same direction that layer 104 is folded (discussed above), such that layer 102 covers layer 104. This approach may generally be described as being similar to how a book cover is wrapped around a book, but it will be appreciated that any technique to wrap layer 102 around layer 104 may be used.

In some implementations, any slack of layer 102 resulting from wrapping layer 102 around layer 104 may be removed 312, by pulling on layer 102 while wrapping layer 102 around layer 104, wherein one or more edges of layer 102 may be created by pulling on layer 102, and wherein the one or more edges of layer 102 may be tucked 314 inside layer 104 prior to securing the one or more edges of layer 102 to hold layer 104 within layer 102. For instance, layer 102 may be pulled tightly around layer 104, where the resulting edges 106 (slack) of layer 102 may be tucked inside layer 104 (shown as dotted lines in FIG. 1). This approach may also generally be described as being similar resembling a book cover around a book.

In some implementations, one or more edges of layer 102 may be secured 304 to hold layer 104 within layer 102. For instance, the above-noted edges 106 (resulting from removing the slack) may be secured (e.g., sewn) into place with a seam that goes around the entire rectangle (or other shape) of MR apparatus 100. It will be appreciated that the one or more edges of layer 102 may be secured 304 to hold layer 104 within layer 102 using techniques other than sewing (e.g., adhesive, buttoning, crimping, etc.). As such, the use of sewing should be taken for example purposes only.

In some implementations, layer 102 may be additionally secured 316 to layer 104 inside the one or more edges. For instance, several seams (when using sewing as an example), may be made down the center, diagonally, etc. to secure layers 102/104 into place.

As such, and as shown in the example implementation of FIG. 2, MR apparatus 100, when placed in a container (e.g., container 200), may be configured to absorb moisture from container 200, and may be further configured to use capillary action to remove the absorbed moisture from container 200. For instance, as shown in at least FIG. 2, MR apparatus 100 may be inserted into the opening of any type or size of container 200 (e.g., hydration bladder, bottle, can, etc.) to allow for easy, clean, storage of the container. MR apparatus 100 may be inserted into the primary opening of container 200 (e.g., until it touches the bottom of the container).

As such, MR apparatus 100 may be neatly stored in the backpack in which the bladder comes until its next usage. In some implementations, generally, MR apparatus 100 may be a fiber-based technology as opposed to hard plastic technology. Hard plastic technology may be reliant on being hanged in an open area and air contact throughout the hydration bladder to provide direct evaporation of moisture. However, MR apparatus 100 may use fibers to absorb moisture in any position in any location and then wick it outside of the bladder (or other container type) using the capillary effect. Once moisture has exited the bladder it is evaporated.

In some implementations, the opposite side of MR apparatus 100 may remain exposed to direct air contact outside of the bladder (also referred to as container 200). For certain screw-top bladders or bottles, both ends of MR apparatus 100 may need to be inserted to contact both ends of the bladder, with a tab extending out of the screw-top lid opening. MR apparatus 100 and the bladder may then be stored wherever the user would like. Remaining moisture in the bladder may be absorbed into the fibers (layers) of MR apparatus 100. Through the capillary effect, moisture may continually move through MR apparatus 100 toward the air exposed portion. Once moisture reaches the air exposed portion, it may evaporate into the air.

As noted above, MR apparatus 100 may layer various combinations of fibers to improve moisture conductivity or for decoration and branding. MR apparatus 100 may also be simply the single capillary fiber layer (e.g., layer 104). Generally, the material being used in MR apparatus 100 is highly absorbent to effect the moisture removal.

MR apparatus 100 may be a shape which resembles a cartoon dog bone, but may also be in nearly be any variation of shape which allows it to touch moist areas of the hydration bladder (or other container), while extending outside of the bladder to transport the moisture to the air for evaporation.

Additionally, the fibers of the bladder itself could vary to accomplish the same function. That is, MR apparatus 100 may be incorporated as the inner layer of the bladder itself without departing from the scope of the present disclosure. In some implementations, non-woven fibers may be used due to the strong capillary effect provided by random placement of the fiber, so the moisture is free to move in the path of least resistance.

In some implementations, the chemistry and nanotechnology of the exterior and interior woven fibers may allow for quick absorption, as well as additional structural support. It will be appreciated that various other fibers may be used without departing from the scope of the disclosure, including those not yet created and microfiber configurations.

Example and non-limiting fibers (and any combination thereof) that may be used for layers 102/104 may include, e.g.:

Cotton, Cellulosic Fibers (e.g., Bast and Leaf Fibers, Wood pulp, Grass Pulp), Animal Based Fibers (e.g., wool, silk, angora, etc.), Synthetic Fibers (e.g., Nylon, Modacrylic, Olefin, Acrylic, Polyester, Rayon, Vinyon, Saran, Spandex, Vinalon, Aramids, Nomex, Kevlar, Twaron, Model, Dyneema/Spectra, PBI (Polybenzimidazole Fiber, Sulfar, Lyocell (artificial, not synthetic), Mineral-based fibers, Nanofibers, Chemistry-based fibers), etc.

Accordingly, MR apparatus 100 may remove moisture from inside of the bladder before that moisture has an opportunity to mildew or form other microbes. When the user wishes to use the hydration bladder they may simply remove MR apparatus 100 and set it aside until they return from their activity.

It will be appreciated that while the present disclosure discusses use with a hydration bladder, other containers and other objects may also be used with the present disclosure. For instance, bottles, cans, containers (e.g., coolers, cooler bags, reusable food storage bags, reusable nutrition pouches, etc.), boots (e.g., ski boots, hockey boots, etc.), gloves, etc. or other objects with hard to access areas or objects that can benefit from removal of moisture may also be used with the present disclosure. Additionally, the present disclosure may be used to remove excess moisture from enclosed rooms (e.g., a closet, basement, outdoor shower, sauna, etc.). Additionally, the present disclosure may be used to remove excess moisture from enclosed products that may be harmed by moisture (e.g., microelectronic circuits). As such, the use of a hydration bladder should be taken as example only and not to otherwise limit the scope of the present disclosure.

It will also be appreciated that while a particular shape and size of the apparatus is shown, various other shapes and sizes as appropriate may be used without departing from the scope of the present disclosure. As such, the use of a particular shape and size should be taken as example only and not to otherwise limit the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements or physical materials used) that may be in the claims below are intended to include any structure, material, or manufacturing act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A moisture removal apparatus configured for partial insertion into a primary opening of a moisture containing container, the moisture containing container having a moisture containing portion, the moisture removal apparatus comprising:
    a first end portion removably positionable within the moisture containing portion of the moisture containing container, the first end portion having a first material layer capable of absorbing moisture from the moisture containing container, the first material layer further configured to transport the absorbed moisture to a second material layer, the second material layer coupled to the first material layer; and
    a second end portion spaced apart from the first end portion and disposed adjacent to the moisture containing container such that the second end portion extends beyond the moisture containing container, the second end portion for receiving absorbed moisture from the second material layer and the second end portion in direct contact with air for purposes of evaporation of the absorbed moisture,
    wherein the first material layer includes a conductive layer including fibers providing a capillary action, the second material layer includes a wicking layer that is less absorptive than the first material layer, the first material layer is wrapped around the second material layer, and the second material layer is folded to create a multiple-ply layer of the second material layer at an edge coupled to the first material layer.

2. The moisture removal apparatus of claim 1, wherein the absorbed moisture is transported from the first end portion to the second end portion using capillary action.

3. The moisture removal apparatus of claim 1, wherein the first material layer is made of at least one synthetic fiber.

4. The moisture removal apparatus of claim 1, wherein the second material layer is made at least of a combination of cotton and at least one additional cellulosic fiber.

5. The moisture removal apparatus of claim 1, wherein the second material layer extends from the first end portion to the second end portion.

6. The moisture removal apparatus of claim 1, wherein the second material layer includes polyester and bamboo.

7. A method of removing moisture from a moisture containing container, the method comprising the steps of:
    positioning a first end portion of a moisture removal apparatus within the moisture containing container, the first end portion having a first material layer and a second material layer coupled to the first material layer, wherein the first material layer includes a conductive layer including fibers providing a capillary action, the second material layer includes a wicking layer that is less absorptive than the first material layer, the first material layer is wrapped around the second material layer, and the second material layer is folded to create a multiple-ply layer of the second material layer at an edge coupled to the first material layer;

positioning a second end portion of the moisture removal apparatus adjacent to the moisture containing container, the second end portion spaced apart from the first end portion and absorbing moisture from the moisture containing container through the first material layer;

transporting the absorbed moisture from the first material layer to the second material layer;

transporting the absorbed moisture from the second material layer to a second end portion of the moisture removal apparatus;

extending the second end portion beyond the moisture containing container in direct contact with air; and exposing the second end portion to direct air contact for purposes of evaporation of the absorbed moisture.

8. The method of claim 7, including using the step of using capillary action to transport the absorbed moisture from the first end portion to the second end.

9. The method of claim 7, including the step of encapsulating the second material layer with the first material layer.

10. The method of claim 7, including the step of extending the second material layer from the first end portion to the second end portion.

11. The method of claim 7, including the step of forming the second material layer with polyester and bamboo.

12. An apparatus combination for removing moisture, comprising:

a container having a primary opening and a moisture containing portion; and a moisture removal apparatus configured for partial insertion into the primary opening of the moisture containing container, the moisture removal apparatus comprising:

a first end portion removably positionable within the moisture containing portion of the moisture containing container, the first end portion having a first material layer capable of absorbing moisture from the moisture containing container, the first material layer further configured to transport the absorbed moisture to a second material layer, the second material layer coupled to the first material layer; and a second end portion spaced apart from the first end portion and disposed adjacent to the moisture containing container such that the second end portion extends beyond the moisture containing container, the second end portion for receiving absorbed moisture from the second material layer and the second end portion in direct contact with air for evaporation of the absorbed moisture, wherein the first material layer includes a conductive layer including fibers providing a capillary action, the second material layer includes a wicking layer that is less absorptive than the first material layer, the first material layer is wrapped around the second material layer, and the second material layer is folded to create a multiple-ply layer of the second material layer at an edge coupled to the first material layer.

13. The apparatus combination of claim 12, wherein the first material layer is made of at least one synthetic fiber.

14. The apparatus combination of claim 12, wherein the first material layer encapsulates the second material layer.

15. The apparatus combination of claim 12, wherein the second material layer is made at least of a combination of cotton and at least one additional cellulosic fiber.

16. The apparatus combination of claim 12, wherein the second material layer extends from the first end portion to the second end portion.

17. The apparatus combination of claim 12, wherein the second material layer includes polyester and bamboo.

18. The moisture removal apparatus of claim 1, wherein the first material layer is wrapped around the second material layer such that any slack of the first material layer is removed.

19. The moisture removal apparatus of claim 1, wherein the first material layer is secured to the second material layer by a seam extending around an entire perimeter of the apparatus and additional securing seams inside the perimeter.

20. The moisture removal apparatus of claim 1, wherein both ends of the apparatus are configured to be inserted into the moisture containing container with a tab extending out of an opening of the container.

* * * * *